(12) United States Patent
Schlette

(10) Patent No.: US 7,912,990 B2
(45) Date of Patent: Mar. 22, 2011

(54) METHOD AND APPARATUS FOR SAFE PARAMETERIZATION IN ACCORDANCE WITH IEC 61508 SIL 1 TO 3 OR EN 954-1 CATEGORIES 1 TO 4

(75) Inventor: Steffen Schlette, Bad Oeynhausen (DE)

(73) Assignee: KW-Software GmbH (DE)

( * ) Notice: Subject to any disclaimer, the term of this patent is extended or adjusted under 35 U.S.C. 154(b) by 483 days.

(21) Appl. No.: 11/719,372

(22) PCT Filed: Nov. 9, 2005

(86) PCT No.: PCT/EP2005/012006
§ 371 (c)(1),
(2), (4) Date: Sep. 18, 2008

(87) PCT Pub. No.: WO2006/053668
PCT Pub. Date: May 26, 2006

(65) Prior Publication Data
US 2009/0125760 A1    May 14, 2009

(30) Foreign Application Priority Data

Nov. 19, 2004  (DE) .......................... 10 2004 055 971

(51) Int. Cl.
*G06F 3/00* (2006.01)
*G06F 11/00* (2006.01)
(52) U.S. Cl. .................. 710/8; 710/10; 714/48
(58) Field of Classification Search ............ 710/8, 10; 714/48
See application file for complete search history.

(56) References Cited

U.S. PATENT DOCUMENTS

| 4,661,953 A * | 4/1987 | Venkatesh et al. ............. 714/42 |
| 5,428,813 A | 6/1995 | Simmering et al. |
| 7,096,468 B1 * | 8/2006 | Dykins et al. ................. 718/100 |

FOREIGN PATENT DOCUMENTS

| DE | 101 02 816 A1 | 8/2001 |
| DE | 102 52 057 A1 | 5/2004 |
| DE | 102 52 277 A1 | 5/2004 |
| EP | 1 126 342 A1 | 8/2001 |
| WO | 98/44399 A2 | 10/1998 |
| WO | 02/067065 A2 | 8/2002 |

OTHER PUBLICATIONS

International Preliminary Report on Patentability.
Haland W A, "Automated Control Systems for the Safety Integrity Levels 3 and 4", Object-Oriented Real-Time dependable systems, 2003. Words 2003 Fall. The Ninth IEEE International Workshop on Anacapri, Italy Oct. 1-3, 2003, Piscataway, NJ, USA,, IEEE, 1, XP010783589 ISBN: 0-1795-2054-5.

* cited by examiner

Primary Examiner — Chun-Kuan Lee
Assistant Examiner — David E Martinez
(74) Attorney, Agent, or Firm — DeMont & Breyer LLC

(57) ABSTRACT

The invention relates to a method and an apparatus for safe parameterization in accordance with IEC 61508 SIL 1 to 3 or EN 954-1 Categories 1 to 4 of safe electronic appliances.
One object of the invention is to describe a way which overcomes the explicit reading back of the parameters from the safe electronic appliance and confirmation of each of these parameters by the user.
For this purpose, the invention proposes that parameter values which are intended for parameterization, are selected or entered via a user interface of an electronic control device and are then transmitted to the electronic appliance, to be kept in at least one memory which can be accessed by the control device, and be read back at least once from the memory for verification of the safe parameterization.

28 Claims, 5 Drawing Sheets

Figure 1:
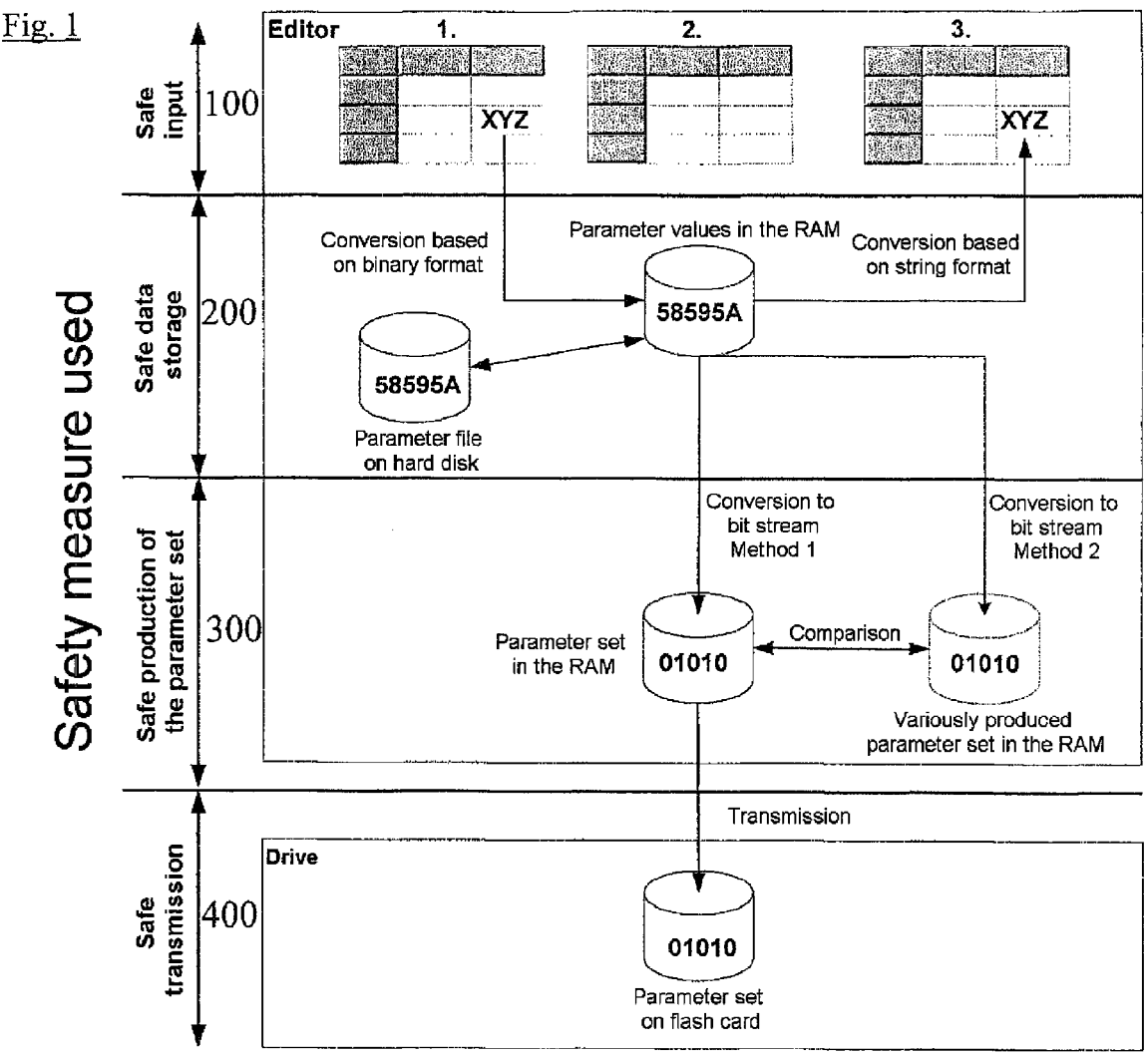

METHOD AND APPARATUS FOR SAFE PARAMETERIZATION IN ACCORDANCE WITH IEC 61508 SIL 1 TO 3 OR EN 954-1 CATEGORIES 1 TO 4

The invention relates to a method and an apparatus for safe or reliable parameterization, i.e. configuration, in accordance with IEC 61508 SIL 1 to 3 or EN 954-1 Categories 1 to 4 of safe electronic appliances, in particular such as drives, PLCs (programmable logic controllers) and embedded controllers, that is to say essentially computer units which are embedded or integrated in a larger system.

Nowadays, safe parameterization in accordance with IEC 61508 SIL 3 or EN 954-1 Category 4 is normally carried out by the entry of respectively desired or required parameters within a program interface of a non-safe software tool on a PC or on some other appropriate controller. This is followed by downloading of the parameters and of a checksum over the complete parameter set via any desired communication channel to the electronic appliance, for the safety functionality. However, this has the particular disadvantage that the individual parameters and the checksum must then be played back once again from the electronic appliance to the PC in order to be confirmed once again by the user in each case, for safety reasons, after having been read back. This is the only way to identify data corruption that may have occurred prior to this. The user-based confirmation that is required for every individual parameter read back from the electronic appliance is ensured on an application-specific basis by an explicit agreement function in the software tool or by handwritten documentation in a record. Only after this has been done, it can be assumed that the correct parameters are available on the electronic appliance, and the actual program execution of the safety functionality of the electronic appliance can be started.

However, furthermore, in particular because of the frequently very large number of safety parameters for each electronic appliance, for example a drive or safety controller, there is also furthermore still a risk that corruption can easily be overlooked even with retrospective checking such as this, or of the check not being carried out with the necessary care. Furthermore, it is impossible to preclude with a high probability the possibility of input errors and/or confirmation errors being made, for example because of lack of concentration of the user, especially during the configuration of a plurality of safe electronic appliances successively.

One major object of the invention is therefore to indicate a way in which the explicit reading back of the parameters from the safe electronic appliance and confirmation of each of these parameters by the user can be overcome for safe configuration in accordance with IEC 61508 SIL 3 or EN 954-1 Category 4.

The solution according to the invention results in a surprising manner just from a subject matter having the features as claimed in one of the attached independent claims.

Advantageous and/or preferred embodiments or developments are the subject matter of each of the dependent claims.

The invention therefore provides that parameter values which are intended for parameterization, i.e. for configuration, are selected or entered via a user interface of an electronic control device and are then transmitted to the electronic appliance, to be kept in at least one memory which can be accessed by the control device, and be read back at least once from the memory for verification of the safe parameterization.

Before transmission to the electronic appliance, the parameter values are preferably read back from a memory which can be accessed by the control device, such that this in its own right makes it possible to protect the selection or entry of parameter values.

In order to additionally appropriately protect the transmission itself, in one preferred development, the parameter values are also read back from a memory which can be accessed by the control device, after transmission to the electronic appliance.

One expedient embodiment of the invention furthermore provides, for simple conversion for the safe selection of entry for furthermore, the steps of storage of the parameter value in at least one of the at least one memories which can be accessed by the control device, deletion of the parameter value on a user display on the control device and renewed setting up of the user display by reading back the stored parameter value to be carried out in an automated process routine for each individual parameter value after selection or entry.

Particularly in order to additionally essentially completely preclude systematic errors in data maintenance and storage as well, safe data storage is also provided by means of a safe modification of a parameter value which is to be modified in a main memory, and safe storage and loading of parameter values in or from a non-volatile memory.

The checking of checksums based on the selected or entered parameter values has been advantageously proven for this purpose.

In one development, the invention provides safe modification by prior calculation of the checksum to be expected for the parameter values in the main memory, modification of the parameter value and subsequent checking of the actual checksum of the parameter values in the main memory.

A further advantageous embodiment provides, in order to increase safety, that furthermore, conversion of a parameter set of parameter values to be transferred from the representation in a memory to a bit-by-bit successive representation of the parameter values, as required for transmission of the parameter set, in a sequence of bytes, by conversion using at least two different methods and checking that the resultant byte sequences and their checksums are the same.

If a parameter set to be transmitted is combined from the resultant byte sequences and the checksums, it is possible to ensure automatic identification of a check that has not been carried out or has been carried out incorrectly, in a very simple manner.

If the parameter set to be transmitted is expediently combined to form a sequence of bytes with parameter values and a checksum over the sequence of bytes, all that is necessary after transmission of the combined parameter set is to read back the checksum of the transmitted parameter set and to compare this with the checksum, which is held in a memory which can be accessed by the control device, of the corresponding parameter set before transmission, in order to ensure safe transmission.

The method is expediently carried out on a computer-aided basis and software basis, thus ensuring respective application-specific adaptation in a very highly efficient manner.

For implementation of a safe partially automated or fully automated method, the invention also provides that a subsequent processing step is initiated only in response to a processing step which has in each case been completed in the correct manner and without errors within the overall safe parameterization procedure.

The invention also proposes an apparatus which is designed in particular in an appropriate manner for carrying out the method for safe parameterization in accordance with IEC 61508 SIL 3 or EN 954-1 Category 4 of electronic appliances which comprises at least one safety module which is used for storage of parameter values, which are intended for transmission to the electronic appliance for its parameterization and are selected or entered via a user interface of an electronic control device, in at least one memory which can be accessed by the control device, and for reading back the parameter values at least once from the memory for verification of safe parameterization.

The at least one safety module preferably controls the user interface for displaying and processing of the parameters for parameterization and/or in its own right or in conjunction with other modules and/or the electronic control device causes the initiation and implementation of the appropriate processing steps.

In one expedient development, the at least one safety module is at least partially a software-based module and, in particular, is an integral component of a complete software platform.

The invention therefore also covers a computer-legible memory medium with legible information stored on it which is read by a computer-aided device for selection or entry of a configuration which is intended for transmission to a safe electronic appliance for its parameterization, resulting in adaptation of the device in order to carry out the method according to the invention.

The method according to the invention and the apparatus according to the invention are particularly suitable for safe parameterization of drives, programmable logic controllers and electronic safety devices, and/or can use essentially any desired field bus or some other communication channel for transmission.

Major advantages of the invention are therefore that the individual step from data input via data maintenance or data storage to production of the download file for safe parameterization and its transmission to the electronic "target" appliance are each protected individually by safety functions, so that data corruption is precluded by the computer-aided process, in particular using a software program which is suitable for application-specific use and is based, for example on Microsoft Windows, in accordance with the error probability required in accordance with IEC 61508 up to SIL 3.

The individual safety function and/or the safety functions which are created according to the invention by means of one or more safety modules which are based on hardware and/or software and are implemented in the controller in order to preset safety parameters thus ensure a safety standard which is sufficiently high that there is no longer any need for reading back from the electronic "target" appliance followed by checking of the parameters by the user.

Figure 2:
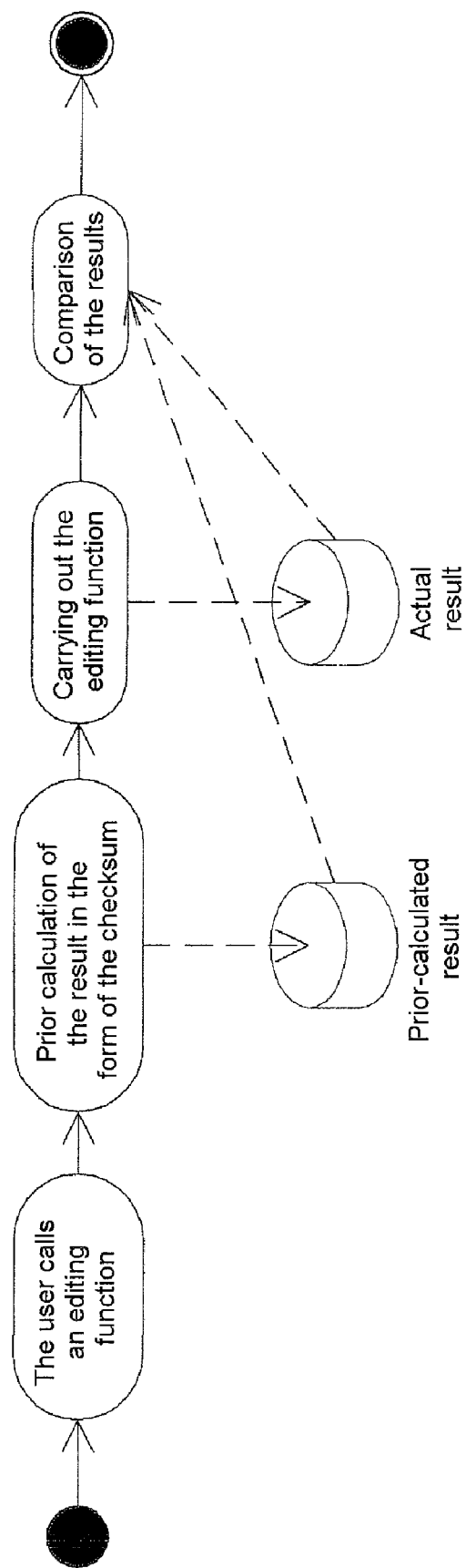
Figure 3:
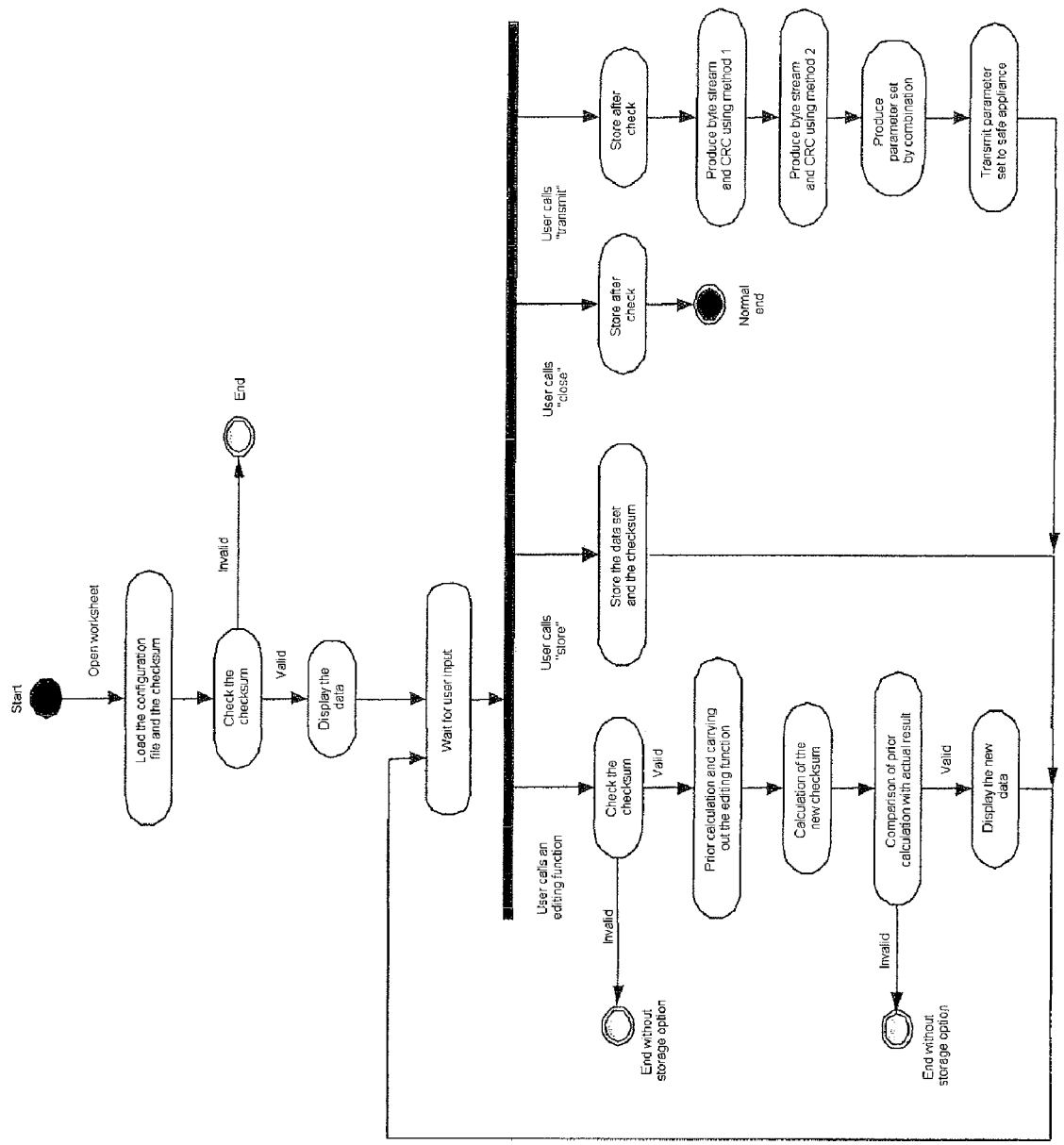
Figure 4:
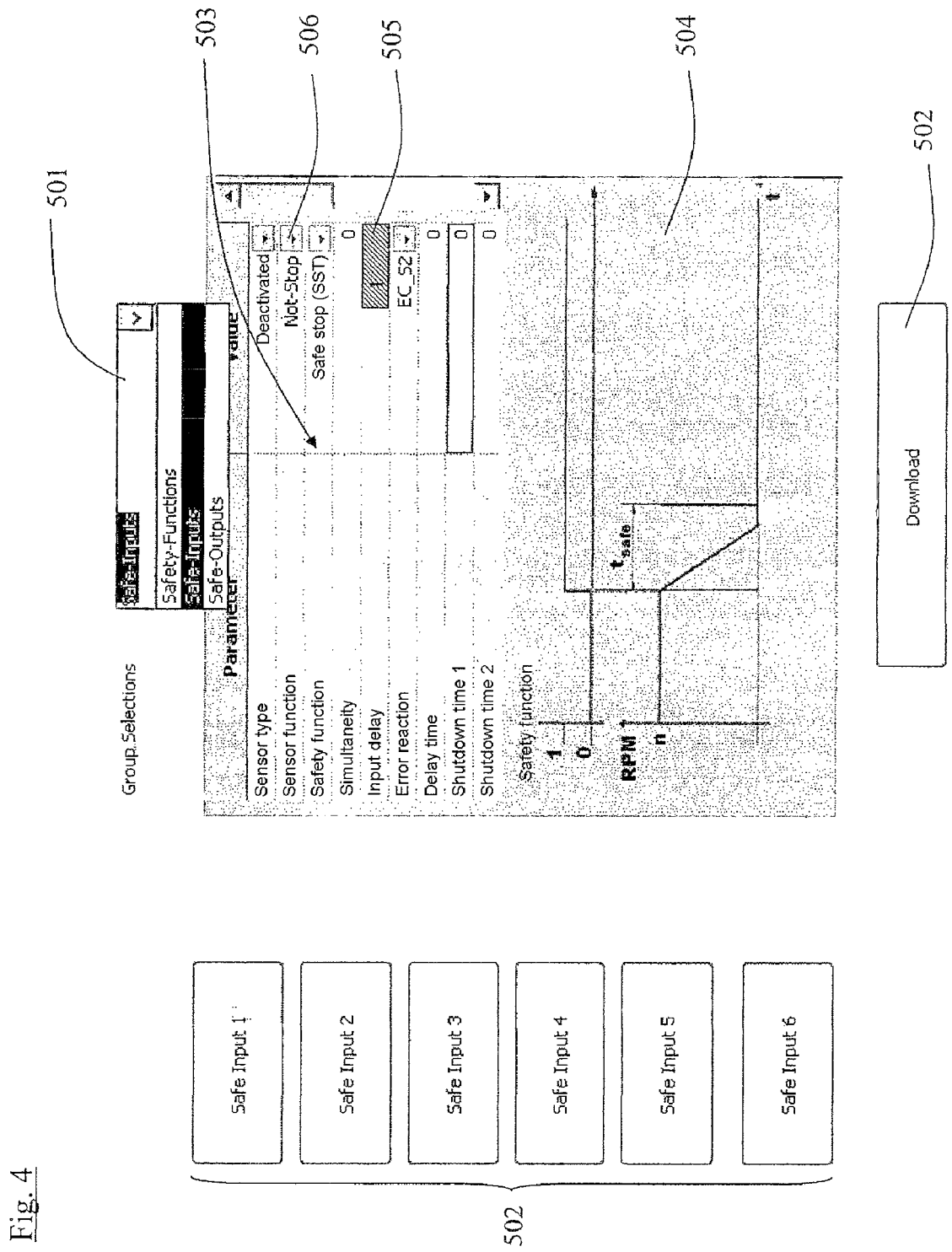
Figure 5:
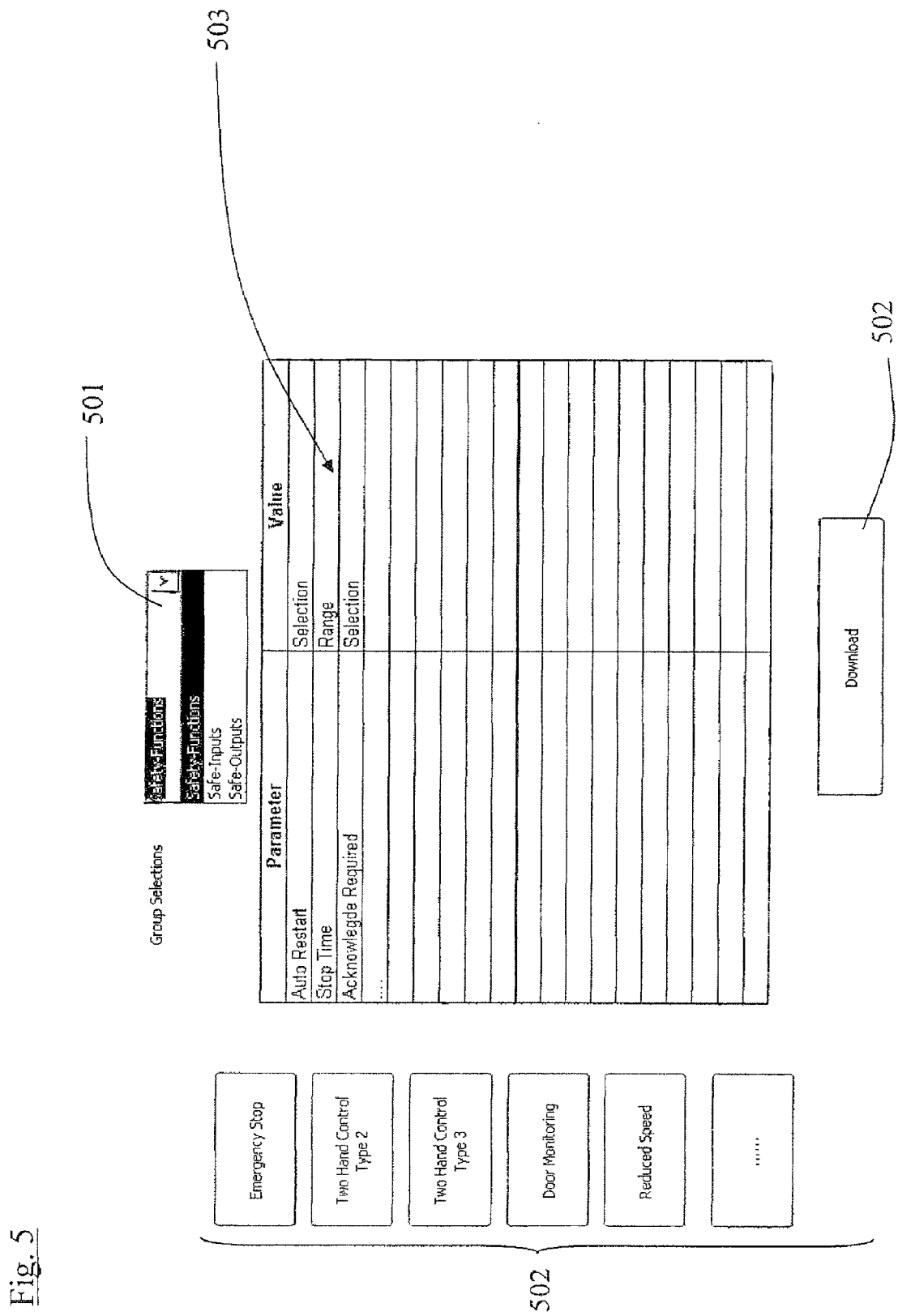

Further features and advantages of the invention will become evident from the following exemplary description of a preferred embodiment with reference to the attached drawings, in which:

FIG. 1 shows a general flowchart of a preferred embodiment of applied safety functionalities according to the invention, FIG. 2 shows, in a highly simplified form, a safe modification of parameter values by prior calculation and comparison according to the invention, FIG. 3 shows a graph relating to examples of procedures from loading of a parameter file from the hard disk of a controller, via the modification of the parameter values in the RAM, and storage of the parameter file on the hard disk according to the invention, FIG. 4 shows a user interface of a controller that has been adapted according to the invention for parameterization of safe inputs of an electronic "target" appliance, and FIG. 5 shows a user interface of a controller which has been adapted according to the invention for parameterization of safety functions of an electronic "target" appliance.

First of all, the following text refers to FIGS. 1 and 2, which each show a simplified flowchart of a safety module concept which results in preferred safety functionalities and is implemented on a controller, which comprises an editor, for parameterization of safe electronic appliances in accordance with IEC 61508 SIL 3 or EN 954-1 Category 4, and of a prior calculation, which is carried out in response to a call of an editing function by the user, for safe modification of a parameter value.

The individual safety functionalities are in this case activated on an automated basis by the safety module or modules which is or are implemented, in response to specific respective initiation conditions.

As can be seen in FIG. 1, the indicated safety functionalities that are used are subdivided into four successive levels 100, 200, 300 and 400.

The first safety functionality which is produced according to the invention and is annotated with the reference symbol 100 ensures safe entry by deletion and reconstruction of the editing display. Automatic deletion and reconstruction of the editing display thus allows the user to once again check the parameters even while they are being entered on the screen. This safety functionality that is used in consequence makes use of the fact that the user knows which parameter values are intended to be set. Since the user essentially knows immediately after making a selection or entry, for example via a keyboard that the parameters to be predetermined must first of all be checked after automatic reconstruction of the result on the screen, there is no need for the previous time-consuming reading back from the electronic "target" appliance, and additional checking of the parameters only after this has been done.

The second safety functionality which is produced according to the invention and is annotated with the reference symbol 200 ensures safe data maintenance and storage by prior calculation, as will be described in the following text.

The third safety functionality which is produced according to the invention and is annotated with the reference symbol 300 ensures safe production of the parameter set by redundancy, that is to say by production of first of all at least two parameter sets using different calculation methods, followed by comparison.

The third safety functionality which is produced according to the invention and is annotated with the reference symbol 400 finally ensures safe transmission of a parameter set which has been verified by comparison, to the safe electronic appliance, by checksum checking.

According to one preferred embodiment of a safety module which is implemented in a controller for safe or reliable parameterization in accordance with existing standards, the following procedure or method of operation is provided in order to ensure the functionality of a safe entry.

In response to the entry or selection of a parameter value by means of an editor by the user, illustrated schematically in FIG. 1 at (1.) for a safe input 100, for example by appropriate operation of an "accept" or "enter" key/button, the parameter value is automatically transferred to the data storage for the controller for storage, in particular for safe storage, as will be described in the following text.

The parameter value that has been entered or selected is then deleted from the display, indicated schematically by (2.) for the safe entry 100 in FIG. 1. The display, as is indicated schematically in FIG. 1 at (3.) for the safe entry 100, is then reconstructed again, to be precise by accessing the parameter value that has just been transferred to the data store.

If, after reconstruction of the display, the user identifies the displayed parameter value as that which has been entered or selected, again, this ensures that this is precisely the parameter value which has also been stored in the data store, since the display has been deleted and reconstructed from the data store. This chain of action thus considerably shortens the procedure that was previously normally carried out of reading back from the appliance to be configured to reading back from the data store.

Systematic errors, such as the value "10" always being stored as "1" in the data store are, however, once again displayed as the value "10" after being read back from the data store of the controller, are improbable since different functions are used for conversion of the displayed string to a binary value for storage in the data store, and vice versa.

However, in order to essentially entirely preclude this class of error, the invention proposes a deeper verification depth in order to ensure safe data storage.

A safety module or the interaction of safety modules is preferably provided for this purpose, which results in safe data storage based on a safe modification of the parameter values in the RAM, that is to say in the main memory, on the one hand and on the other hand on safe storage and loading of the parameter file on a hard disk or on some other non-volatile memory.

For this purpose, the data storage for the parameter values in the RAM of the parameterization editor is expediently protected by a checksum check. This also ensures that, when an entry is made, only the parameter value which is actually intended to be changed is ever modified. All of the other parameter values which are held in the RAM and may be contained in a parameter file loaded previously from the non-volatile memory are inhibited from being changed before the editing of a parameter, and are checked for corruption after the parameter has been edited. This is preferably done, with reference to FIG. 2, in response to a call of an editing function by a prior calculation of the CRC to be expected for the parameter values in the RAM, the modification of a parameter value and the checking of the actual CRC of the parameter values in the RAM. The resultant parameter file is not backed up again on the hard disk until after the check has been carried out, the display has been reconstructed and the corresponding backward check by the user, as described above, has been carried out.

Once again, for transmission of the parameter values to the electronic appliance, access is made to parameter values which have been loaded or can be loaded in the RAM. Since, however, the RAM normally contains parameter values in a different manner than that which must be transmitted to the safe electronic appliance, the parameter set to be transmitted must in these situations first of all be produced from the parameter values stored in the RAM. For example, parameter values are frequently stored in normal C/C++ data types, such as ULONG, in the RAM. In contrast, the values are stored bit-by-bit successively in a byte stream in the parameter set to be transmitted.

Since it is impossible to preclude systematic or sporadic errors during the conversion of the values from the representation in the RAM to the representation in the byte stream, the invention also proposes use or interaction of safety modules, which first of all carry out a conversion such as this using at least two different methods in accordance with the safety functionality annotated with the reference symbol 300 in FIG. 1, and checks that the two resultant byte streams and their respective checksums are the same.

The parameter set to be transmitted is produced by combination only in response to the production of redundant byte streams and the identification that the differently produced byte streams and their respective checksums are the same, for example with the byte stream of the parameter set that has been produced using method 1 shown in FIG. 1 and the checksum of the parameter set which has been produced using method 2 in FIG. 1 being combined to form the resultant, and thus to form the safely produced parameter set to be transmitted to the electronic "target" appliance. In consequence, depending on the specific module design and/or the implementation of the safety function in the safe appliance and/or in the controller, a check for equality which has not been carried out or has been carried out incorrectly is identified and can be displayed in an appropriate form to the user.

The redundant production of the parameter set thus results in a byte stream with parameter values and in a checksum over the byte stream. The two are transmitted jointly, automatically or on demand by the user, to the appliance with safety functions.

In one preferred development, the transmission is also protected by a further safety functionality 400.

For this purpose, after transmission, the checksum is expediently read back again, and is compared with the checksum in the editor. The result of this check is signaled to the user, for example in the form of a message block, for example "transmission successful"/"transmission not successful". For example, the aim in particular in this case is for unsuccessful transmission to be clearly indicated to the user by means of appropriate icons or other indications on a user interface which is made available to the user in order to operate the controller.

The invention also provides for the safety module to be designed to implement a safety functionality such that, whenever the safe appliance is restarted, the checksum of the byte stream transmitted to the appliance is checked, and if any corruption is found in the byte stream, the start-up is prevented or inhibited.

FIG. 3 once again shows major steps of the procedure according to the invention for safe parameterization for loading of a parameter file from the hard disk, via the modification of individual parameter values in the RAM and the storage of the parameter file on the hard disk to transmission of the parameter set to the safe electronic "target" appliance, on the basis of the example in FIG. 3 to a safe appliance.

As can be seen from FIG. 3, each processing step in the overall procedure is initiated only in response to a processing step having previously been completed in the correct and error-free manner. A processing step which has not been completed and which may, for example, also include waiting for a user input thus automatically blocks the procedure. In order to further enhance safety, the procedure is expediently automatically terminated in response to a processing step which has been completed incorrectly or with errors, or in response to a processing step during which an error has been identified.

The following text refers to FIGS. 4 and 5, which show an example of a user interface for a controller, such as a PC or an IPC (Inter Process Communication) unit or some other electronic (control) appliance, with safety modules according to the invention, implemented for safe configuration in accordance with IEC 61508 SIL 3, in order to ensure the safety functionalities as described above.

As already discussed above, the controller for the display and processing of the safety-relevant parameters can be designed for specific safety functions, safe inputs and/or safe outputs for example for a drive or for a so-called safety controller on an application basis by implementation of a safety module or of a plurality of interacting safety modules, in particular as a "stand-alone" program or is an integral component of a complete software platform.

All of the safety parameters are preferably subdivided into groups and subgroups for the user and, after selection, are displayed in a table for processing. As shown in FIGS. 4 and 5, the groups may be selected via the ComboBox 501, which is annotated with "Group selections". "Safety functions" (Safety functions), "safe inputs" (safe inputs) and "safe outputs" (safe outputs) can be selected as the respective groups for parameterization. As shown in FIG. 4, the interface is activated for safe parameterization of safe inputs, as is shown in FIG. 5, the interface is activated for safe parameterization of safety functions.

Each group is in turn subdivided into parameter subgroups 502 which, in the present example, can be selected by means of appropriate keys/pushbuttons. The respectively selected parameter subgroup is then shown in the table.

As shown in FIG. 4, six parameter subgroups 502, annotated "safe input 1" to "safe input 6" are reserved for the "safe inputs" parameter group. The respective selection of a subgroup results in the display of the corresponding parameters of the selected safe input in a table 503, with the parameter types 503a and the associated parameter values that are stored in the data memory being displayed. If parameter settings which are related to further parameters are made in the table 503, then the parameters which are not required are expediently automatically masked out.

A graphic 504 is preferably stored for each parameter, visually showing the influence of the parameter on the appliance behavior and/or system behavior, to the user. If the selection of the parameter in the table is changed, then the corresponding graphic is also changed.

If a parameter in the table is now edited, this parameter is stored in a protected form in the PC memory as described above, is deleted on the user interface, is retrieved from the memory again and is displayed on the interface, thus precluding data corruption for that entry, with appropriate safety, in accordance with the requirements of IEC 61508 SIL 3.

When parameter values are edited, as annotated by 505 in FIG. 4, then the values are expediently displayed in an emphasized form, for example in blue script. If the values to be set are, for example, lists then selection boxes 506 are preferably used in the table. When a box such as this is selected, the values shown in it are preferably also displayed in an emphasized form, in order to illustrate the editing mode. Furthermore a description may be displayed for each parameter, for example in the tooltip. If this is a range parameter, then both the minimum and maximum value are displayed, as well as the step width. If the user enters an unacceptable parameter value, then this is indicated to the user by some other form of emphasis, for example by changing the script color for the parameter value to red, or else in an audible form.

As described above, safe storage in the memory is ensured in particular by all of the rest of the memory area being protected by safe parameters, and being protected by a CRC, on selection of a parameter. After processing of the first parameter, a CRC is once again formed over the same memory area, and is compared with the initial CRC. This precludes data corruption of the safe parameters that have already been processed, by editing of a further single parameter in accordance with IEC 61508 SIL 3.

The "safe outputs" and "safety functions" are parameterized essentially in the same way. Once the safe parameterization process has been completed, this can be followed by the download. When the download is activated by operation of the download key 507, as shown in FIGS. 4 and 5, a dialogue is expediently overlaid, which once again asks the user whether all of the parameters have been entered correctly. A file with the individual parameters is in each case produced by appropriate confirmation of this dialogue using two redundant processes, each of which is once again protected by a CRC.

After combination of the files that have been produced in a redundant form to form a safe parameter file, this safe parameter file is downloaded to the target hardware, that is to say in the example under consideration to the drive or to the safety controller, via any desired field bus or some other communication channel of the manufacturer. In contrast to the previously normal methods, only the CRC is now read back from the target appliance. The CRC from the target appliance is then compared with the CRC for the parameter file as stored in the electronic controller. If they match, a dialogue appears for the user, indicating whether the safe configuration was successful "transmission successful"/"transmission unsuccessful".

Thus, overall, the invention ensures reading back of the safe or reliable parameterization in accordance with IEC 61508 SIL 3 or EN 954-1 category for a target appliance from the memory of an electronic (control) appliance without any explicit confirmation of the individual parameters by the user.

The invention claimed is:

1. A method for safe or reliable parameterization in accordance with IEC 61508 SIL 3 or EN 954-1 Category 4 of an electronic appliance, the method comprising:
   acquiring parameter values which are intended for parameterization and having been selected or entered via a user interface of an electronic control device;
   subsequently transmitting the selected or entered parameter values to the electronic appliance;
   keeping the selected or entered parameter values in at least one memory, which can be accessed by the control device; and
   reading back the selected or entered parameter values at least once from the at least one memory for verification of the safe parameterization;
   wherein conversion of a parameter set of parameter values to be transferred from the representation in a memory to a bit-by-bit successive representation of the parameter values, as required for transmission of the parameter set, in a sequence of bytes, comprises conversion using at least two different methods and checking that the resultant byte sequences and their checksums are the same.

2. The method as claimed in claim 1, wherein, furthermore, the parameter values are read back from a memory which can be accessed by the control device, before transmission to the electronic appliance, for verification of safe selection or entry of parameter values.

3. The method as claimed in claim 1, wherein, furthermore, the parameter values are read back from a memory which can be accessed by the control device, after transmission to the electronic appliance, for verification of safe transmission to the electronic appliance.

4. The method as claimed in claim 1, wherein, furthermore, i) storage of the parameter value in at least one of the at least one memory which can be accessed by the control device, ii) deletion of the parameter value on a user display of the control device, and iii) renewed setting up of the user display by reading back the stored parameter value are carried out in an automated process routine for each individual parameter value after selection or entry.

5. The method as claimed in claim 1, wherein, furthermore, storage of selected or entered parameter values comprises i)

respective safe modification of a parameter value to be modified in a main memory and ii) safe storage and loading of parameter values in or from a non-volatile memory.

6. The method as claimed in claim 5, wherein, furthermore, the storage of selected or entered parameter values comprises a check being carried out of checksums based on the selected or entered parameter values.

7. The method as claimed in claim 6, wherein, furthermore, before the modification of a parameter value that is to be modified, the checksum to be expected for the parameter values is calculated in advance in the main memory and, after modification of the parameter value, a check is carried out of the actual checksum of the parameter values in the main memory.

8. The method as claimed in claim 1, wherein, furthermore, a parameter set to be transmitted is combined from the resultant byte sequences and their checksums.

9. The method as claimed in claim 8, wherein, furthermore, the parameter set to be transmitted is combined to form a sequence of bytes with parameter values and a checksum over the sequence of bytes.

10. The method as claimed in claim 9, wherein, furthermore, after the transmission of the combined parameter set, the checksum of the transmitted parameter set is read back and is compared with the checksum, as held by a memory which can be accessed by the control device, of the corresponding parameter set before transmission.

11. The method as claimed in claim 1, which is carried out on a computer-aided basis and software basis.

12. The method as claimed in claim 1, in which a subsequent processing step is initiated in an automated form only after response to a processing step which has in each case been completed in the correct manner and without errors within the overall safe parameterization procedure.

13. An apparatus for safe or reliable parameterization in accordance with IEC 61508 SIL 3 or EN 954-1 Category 4 of electronic appliances, comprising:
at least one safety module that is for i) the storage of parameter values, which are intended for transmission to the electronic appliance for its parameterization and are selected or entered via a user interface of an electronic control device, in at least one memory which can be accessed by the control device, and for ii) the reading back of the parameter values at least once from the at least one memory for verification of safe configuration; and
the at least one memory;
the apparatus furthermore comprising at least one safety module that designed in its own right or in conjunction with other modules and/or the electronic control device to cause a parameter set to be converted to a bit-by-bit successive representation of the parameter values in a sequence of bytes using at least two different methods and checking that the resultant byte sequences and their checksums are the same.

14. The apparatus as claimed in claim 13, in which the at least one safety module controls the user interface for display and processing of the parameters for configuration.

15. The apparatus as claimed in claim 13, with the at least one safety module interacting with the control device.

16. The apparatus as claimed in claim 13, with the at least one safety module being at least partially a software-based module.

17. The apparatus as claimed in claim 16, with the at least one safety module being an integral component of a complete software platform.

18. The apparatus as claimed in claim 13, furthermore comprising at least one safety module that is designed in its own right or in conjunction with other modules and/or the electronic control device to cause the parameter values to be read back from a memory which can be accessed by the control device, before transmission to the electronic appliance for verification of a safe selection of entry of parameter values.

19. The apparatus as claimed in claim 13, furthermore comprising at least one safety module that is designed in its own right or in conjunction with other modules and/or the electronic control device to cause the parameter values to be read back from a memory which can be accessed by the control device, after transmission to the electronic appliance for verification of safe transmission to the electronic appliance.

20. The apparatus as claimed in claim 13, furthermore comprising at least one safety module that is designed in its own right or in conjunction with other modules and/or the electronic control device, for each individual parameter value, after selection or entry to cause the parameter value to be stored in at least one of the at least one memories which can be accessed by the control device, the deletion of the parameter value on a user display of the control device and the renewed setting up of the user display by reading back the stored parameter value in an automated process routine.

21. The apparatus as claimed in claim 13, furthermore comprising at least one safety module that is designed in its own right or in conjunction with other modules and/or the electronic control device for storage of selected or entered parameter values in order to cause respective safe modification of a parameter value to be modified in a main memory, and the safe storage and loading of parameter values into or from a non-volatile memory.

22. The apparatus as claimed in claim 21, with the at least one safety module that is designed in its own right or in conjunction with other modules and/or the electronic control device to cause checking of checksums which are based on the selected or entered parameter values.

23. The apparatus as claimed in claim 22, with the at least one safety module that is designed in its own right or in conjunction with other modules and/or the electronic control device to cause the prior calculation of the checksum to be expected of the parameter values in the main memory and a check of the actual checksum of the parameter values in the main memory.

24. The apparatus as claimed in claim 13, with the at least one safety module that is designed on its own or in conjunction with other modules and/or the electronic control device to cause a parameter set to be formed from a combination of the resultant byte sequences and their checksums.

25. The apparatus as claimed in claim 13, furthermore comprising at least one safety module that is designed in its own right or in conjunction with other modules and/or the electronic control device to cause the checksum of a transmitted parameter set to be read back, access to the checksum which is held in a memory associated with the control device, and comparison of the two checksums.

26. The apparatus as claimed in claim 25, with the at least one safety module that is designed in its own right or in conjunction with other modules and/or the electronic control device to automatically initiate a subsequent processing step just in response to a processing step which has in each case been completed in a correct and error-free manner within the overall safe configuration procedure.

27. A method for safe parameterization of drives, programmable logic controllers or electronic safety devices, the method comprising utilizing the apparatus as claimed in claim 13.

28. The method as claimed in claim 27, further comprising utilizing a field bus.

* * * * *